US011143777B2

(12) United States Patent
Jin et al.

(10) Patent No.: US 11,143,777 B2
(45) Date of Patent: Oct. 12, 2021

(54) QUADRUPLE TRANSMITTER AND METHODS TO DETERMINE WAVE VELOCITIES OF A DOWNHOLE FORMATION

(71) Applicant: Halliburton Energy Services, Inc., Houston, TX (US)

(72) Inventors: Jing Jin, Singapore (SG); Chung Chang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 369 days.

(21) Appl. No.: 16/342,910

(22) PCT Filed: Aug. 13, 2018

(86) PCT No.: PCT/US2018/046503
§ 371 (c)(1),
(2) Date: Apr. 17, 2019

(87) PCT Pub. No.: WO2020/036579
PCT Pub. Date: Feb. 20, 2020

(65) Prior Publication Data
US 2021/0003732 A1 Jan. 7, 2021

(51) Int. Cl.
*G01V 1/52* (2006.01)
*E21B 47/017* (2012.01)
*G01V 1/02* (2006.01)

(52) U.S. Cl.
CPC .............. *G01V 1/52* (2013.01); *E21B 47/017* (2020.05); *G01V 1/159* (2013.01); *G01V 2001/526* (2013.01); *G01V 2210/6222* (2013.01)

(58) Field of Classification Search
CPC .... G01V 1/52; G01V 1/159; G01V 2001/526; G01V 1/44
(Continued)

(56) References Cited

U.S. PATENT DOCUMENTS 5,030,873 A * 7/1991 Owen .................... G01V 1/145
310/337
5,831,934 A * 11/1998 Gill ......................... G01V 1/52
367/25
(Continued)

OTHER PUBLICATIONS

Alford et al., "Sonic Logging While Drilling—Shear answer", Oilfield Review, Spring 2012: 24, No. 1.
(Continued)

*Primary Examiner* — Ian J Lobo
(74) *Attorney, Agent, or Firm* — McGuireWoods LLP

(57) ABSTRACT

The disclosed embodiments include quadrupole transmitters and methods to determine wave velocities of a downhole formation. In some embodiments, the quadrupole transmitter has a first piezoelectric ring and a second piezoelectric ring that alternatively contracts and expands in opposite radial directions relative to the first piezoelectric ring in response to being simultaneously excited with the first piezoelectric ring. The quadrupole transmitter also includes a covering sleeve surrounding exterior surfaces of the two piezoelectric rings. The quadrupole transmitter further includes a windowed sleeve surrounding the two piezoelectric rings and having a first portion and a second portion adjacent to the first portion. The first portion and the second portion are formed from multiple window sections and adjacent covered sections that are positioned around different sections of the piezoelectric rings to allow transmission of quadrupole acoustic signals when the piezoelectric rings are simultaneously excited.

20 Claims, 5 Drawing Sheets

(58) Field of Classification Search
USPC .......................................................... 367/161
See application file for complete search history.

(56) References Cited

U.S. PATENT DOCUMENTS

| | | | |
|---|---|---|---|
| 6,568,486 B1 | 5/2003 | George | |
| 6,614,360 B1* | 9/2003 | Leggett, III | E21B 44/00 340/853.1 |
| 8,599,648 B1 | 12/2013 | Butler et al. | |
| 2003/0058739 A1* | 3/2003 | Hsu | G01V 1/46 367/56 |
| 2005/0067191 A1 | 3/2005 | Miyamoto et al. | |
| 2005/0152219 A1 | 7/2005 | Garcia-Osuna et al. | |
| 2006/0198242 A1 | 9/2006 | Geerits et al. | |
| 2019/0179048 A1* | 6/2019 | Syresin | G01V 1/50 |

OTHER PUBLICATIONS

International Search Report and Written Opinion dated Apr. 29, 2019, issued in related PCT/US2018/046503.

* cited by examiner

QUADRUPLE TRANSMITTER AND METHODS TO DETERMINE WAVE VELOCITIES OF A DOWNHOLE FORMATION

BACKGROUND

The present disclosure relates generally to quadruple transmitters and methods to determine wave velocities of downhole formations.

Downhole acoustic tools are sometimes deployed in boreholes to measure compressional and shear wave velocities of a formation. The wave velocities of the formation may be analyzed to determine formation properties of the formation. Monopole transmitters are sometimes used in downhole acoustic tools to excite compressional wave and to generate shear waves in a fast formation, where shear wave velocities of the generated shear waves are faster than the fluid velocities of fluids flowing through the formation or flowing in the borehole. However, in a slow formation, where the fluid velocities of fluids flowing through the borehole are faster than the shear wave velocities of the generated shear waves, the generated shear waves may not reach a critical refraction condition and may not be accurately used to determine formation properties of the formation.

BRIEF DESCRIPTION OF THE DRAWINGS

Illustrative embodiments of the present disclosure are described in detail below with reference to the attached drawing figures, which are incorporated by reference herein, and wherein.

Figure 1A:
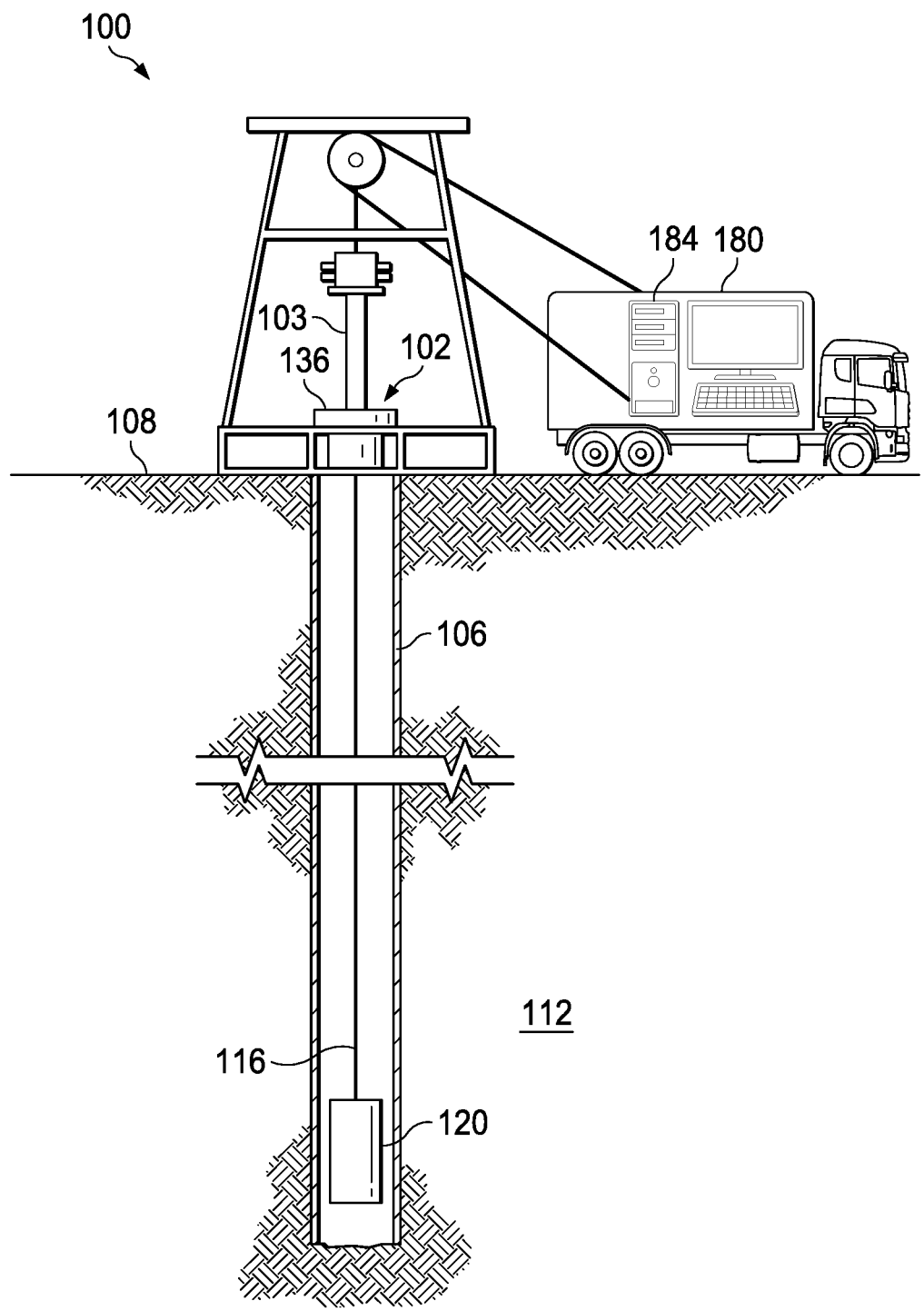
FIG. 1A is a schematic, side view of a logging environment, where a quadrupole transmitter is deployed.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to quadrupole transmitters, downhole tools having quadrupole transmitters, and methods to determine wave velocities of a downhole formation. A quadrupole transmitter, or a downhole tool having a quadrupole transmitter is deployed in a borehole of a hydrocarbon production well to determine wave velocities of a downhole formation proximate the borehole. The quadrupole transmitter includes at least two piezoelectric rings that alternatively contract and expand in opposite radial directions relative to each other in response to being simultaneously excited. In some embodiments, a piezoelectric ring expands relative to another piezoelectric ring if the exterior surface of the expanding piezoelectric ring is expanding towards the formation. Further, a piezoelectric ring compresses relative to another piezoelectric ring if the exterior surface of the compressing ring is compressing towards a central axis of the quadrupole transmitter. In some embodiments, different voltages are applied to the piezoelectric rings when the piezoelectric rings are simultaneously excited to cause the piezoelectric rings to simultaneously expand and to compress relative to each other. In some embodiments, additional piezoelectric rings are deployed to augment acoustic signals generated due to the contraction and expansion of the piezoelectric rings and to vary the intensity of the acoustic signals generated due to the contraction and expansion of the piezoelectric rings. In some embodiments, where the quadrupole transmitter includes three piezoelectric rings, the third piezoelectric ring contracts and expands in opposite radial directions relative to one of the other two piezoelectric rings in response to being simultaneously excited with at least one of the other two piezoelectric rings. In one or more of such embodiments, where the quadrupole transmitter includes four piezoelectric rings, the fourth piezoelectric ring contracts and expands in opposite radial directions relative to the third piezoelectric ring in response to being simultaneously excited with the third piezoelectric ring. In some embodiments, the quadrupole transmitter also includes additional piezoelectric rings that contract and expand in opposite radial directions relative to one or more of the other piezoelectric rings of the quadrupole transmitter.

The quadrupole transmitter also includes a windowed sleeve that surrounds the piezoelectric rings. The windowed sleeve includes at least two portions, where each portion of the at least two portions is formed from multiple window sections and adjacent covered sections. As used herein, a covered section of the windowed sleeve is a section that is formed from a solid material, whereas a window section of the windowed sleeve is an open section (not covered by any material) or is formed from a material that allows a greater threshold intensity of acoustic signals to pass through relative to the threshold intensity of acoustic signals that would pass through the solid material used to form the covered section. When both the first piezoelectric ring and the second piezoelectric ring are excited, window sections of the windowed sleeve allow acoustic signals generated due to the contraction and expansion of the two piezoelectric rings to travel radially outward towards the formation, whereas covered sections of the windowed sleeve reduce or prohibit acoustic signals generated due to the contraction and expansion of the two piezoelectric rings to travel radially outward towards the formation. The locations of the window sections and the covered sections of the windowed sleeve allow transmission of acoustic signals that propagate in a quadrupole mode (hereafter referred to as quadrupole acoustic signals) when the first piezoelectric ring and the second piezoelectric ring are simultaneously excited.

In some embodiments, the windowed sleeve has a first portion and a second portion that is adjacent of the first portion. The first portion includes two window sections and two covered sections, where the window sections are positioned opposite each other and adjacent to the covered sections. The second portion also includes two window sections and two covered sections, where the window sections are positioned opposite each other and adjacent to the covered sections. However, the window sections of the first portion and the window sections of the second portion are diagonal relative to each other. An exemplary illustration of the placement of window sections and covered sections is provided in FIG. 3 and is described in the paragraphs below. In some embodiments, where the quadrupole transmitter includes two piezoelectric rings, the first portion of the windowed sleeve surrounds one of the two piezoelectric rings, and the second portion of the windowed sleeve surrounds the other one of the two piezoelectric rings. In some embodiments, where the quadrupole transmitter includes three or more piezoelectric rings, at least two of the piezoelectric rings are covered by one of the two portions of the windowed sleeve and the remaining piezoelectric rings are covered by the other portion of the windowed sleeve. In other embodiments, where the quadrupole transmitter includes three or more piezoelectric rings, the windowed sleeve also has three or more portions, each having two window sections and two covered sections, where the window sections are positioned opposite each other and adjacent to the covered sections. In one or more of such embodiments, the window sections and the covered sections of each portion are diagonal to the window sections and the covered sections of an adjacent portion of the windowed sleeve.

The quadrupole transmitter also includes a covering sleeve that surrounds the exterior surfaces of the piezoelectric rings to protect the piezoelectric rings from external contaminants. In some embodiments, the covering sleeve is formed from a material (such as plastic) that allows at least a threshold intensity of acoustic signals generated by the excitation of the piezoelectric rings to be transmitted into the formation. In some embodiments, the covering sleeve is less than 0.25 inch thick to allow at least the threshold intensity of acoustic signals generated by the excitation of the piezoelectric rings to be transmitted into the formation. In some embodiments, the covering sleeve is deployed between the piezoelectric rings and the windowed sleeve. In other embodiments, the covering sleeve also covers the external surface of the windowed sleeve.

In some embodiments, the quadrupole transmitter is a component of a downhole acoustic tool. In such embodiments, the downhole acoustic tool also includes at least one acoustic receiver operable to receive signals of waves transmitted through a formation proximate the downhole acoustic tool, such as quadrupole acoustic signals generated due to the excitation of the piezoelectric rings as the generated quadrupole acoustic signals travel through the formation. In some embodiments, the downhole acoustic tool also includes a collar portion that grips to a conveyance (defined in the paragraphs below) that is used to deploy the downhole acoustic tool. In some embodiments, multiple downhole acoustic tools are simultaneously deployed at different depths to determine wave velocities of the downhole formation. Additional descriptions of the foregoing quadrupole transmitters, tools, and methods to determine wave velocities of a downhole formation are described in the paragraphs below and are illustrated in FIGS. 1-4.

Turning now to the figures, FIG. 1A is a schematic, side view of a wireline environment 100 with a quadrupole transmitter 120, deployed in a borehole 106 to determine wave velocities of a formation 112 surrounding the borehole 106. FIG. 1A may also represent another completion or preparation environment where a wireline operation is performed. In the embodiment of FIG. 1A, a conveyance 116, optionally carried by a vehicle 180, is positioned proximate to the well 102. The conveyance 116 along with the quadrupole transmitter 120 are lowered from surface 108 down the borehole 106, i.e. downhole. In one or more embodiments, the conveyance 116 and the quadrupole transmitter 120 are lowered downhole through a blowout preventer 103 positioned at wellhead 136. In one or more embodiments, the conveyance 116 may be wireline, slickline, coiled tubing, drill pipe, production tubing, fiber optic cable, downhole tractor or another type of conveyance operable to deploy the quadrupole transmitter 120. The conveyance 116 provides mechanical suspension of the quadrupole transmitter 120 as the quadrupole transmitter 120 is deployed downhole. In one or more embodiments, the conveyance 116 also transmits signals to the quadrupole transmitter 120. In one or more embodiments, the conveyance 116 also provides power to the quadrupole transmitter 120 as well as other downhole components. In one or more embodiments, the conveyance 116 also provides downhole telemetry. Additional descriptions of telemetry are provided in the paragraphs below. In one or more embodiments, the conveyance 116 also provides a combination of power and downhole telemetry to the quadrupole transmitter 120. For example, where the conveyance 116 is a wireline, coiled tubing (including electro-coiled-tubing), or drill pipe, power and data are transmitted along the conveyance 116 to the quadrupole transmitter 120.

The quadrupole transmitter 120 represents any transmitter having at least two piezoelectric rings and a windowed sleeve surrounding the at least two piezoelectric rings, where the windowed sleeve has multiple window sections and adjacent covered sections that are positioned around different sections of the piezoelectric rings to allow transmission of quadrupole acoustic signals when the piezoelectric rings are simultaneously excited. In some embodiments, the quadrupole transmitter 120 is a component of a downhole acoustic tool (not shown) that is operable of transmitting and receiving data indicative of acoustic signals of waves transmitted through formation 112. In such embodiments, the downhole acoustic tool also includes or is coupled to a receiver (not shown) that is operable to receive data indicative of acoustic signals of waves generated by the quadrupole transmitter 120.

The downhole acoustic tool is communicatively connected to controller 184 via a telemetry system (not shown) and is operable to provide data indicative of the acoustic signals of waves generated by the quadrupole transmitter 120 to the controller 184. The controller 184 represents any electronic device having hardware and software components operable to calculate wave velocities of formation 112 based on the received data indicative of acoustic signals of waves generated by the quadrupole transmitter 120. Examples of the controller 184 include, but are not limited to, desktop computers, laptop computers, server computers, work stations, tablet computers, smartphones, PDAs, as well as other electronic devices operable of performing the foregoing operations to calculate wave velocities of formation 112.

Figure 1B:
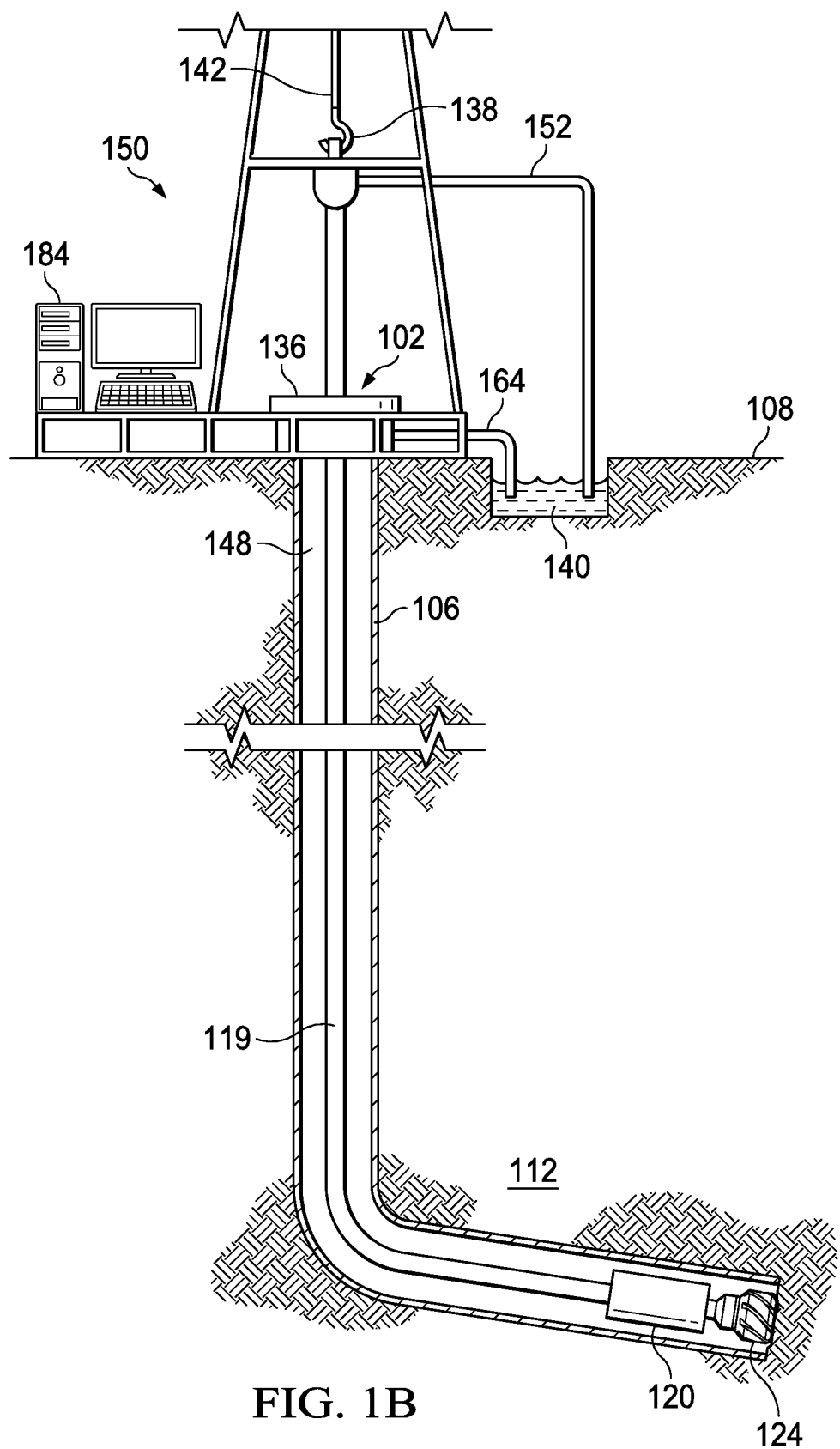
FIG. 1B is a schematic, side view of a logging while drilling (LWD)/measurement while drilling (MWD) environment where the quadrupole transmitter of FIG. 1A is deployed.

FIG. 1B is a schematic, side view of a LWD/MWD environment 150 with the quadrupole transmitter 120 deployed to measure the properties of the formation 112 during a drilling operation. FIG. 1B may also represent another completion or preparation environment where a drilling operation is performed. A hook 138, cable 142, traveling block (not shown), and hoist (not shown) are provided to lower a drill string 119 down the borehole 106 or to lift the drill sting 119 up from the borehole 106.

At the wellhead 136, an inlet conduit 152 is coupled to a fluid source (not shown) to provide fluids, such as drilling fluids, downhole. The drill sting 119 has an internal cavity that provides a fluid flow path from the surface 108 down to the quadrupole transmitter 120. In some embodiments, the fluids travel down the drill sting 119, through the quadrupole transmitter 120, and exit the drill sting 119 at the drill bit 124. The fluids flow back towards the surface 108 through a borehole annulus 148 and exit the borehole annulus 148 via an outlet conduit 164 where the fluids are captured in container 140. In some embodiments, sensors or transducers (not shown) of LWD systems are located at the lower end of the drill string 119. In one or more embodiments, sensors employed in LWD applications are built into a cylindrical drill collar that is positioned close to the drill bit 124. While drilling is in progress, these sensors continuously or intermittently monitor acoustic signals generated by the quadrupole transmitter 120 as well as waves flowing through the formation 120, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in the borehole 106 to provide telemetry, telemetry information is transmitted by adjusting the timing or frequency of viable pressure pulses in the drilling fluid that is circulated through the drill string 119 during drilling operations. In one or more embodiments, an acoustic telemetry system that transmits data via vibrations in the tubing wall of the drill string 119 is deployed in the borehole 106 to provide telemetry. More particularly, the vibrations are generated by an acoustic transmitter (not shown) mounted on the drill string 119 and propagate along the drill string 119 to an acoustic receiver (not shown) also mounted on the drill string 119. In one or more embodiments, an electromagnetic wave telemetry system that transmits data using current flows induced in the drill string 119 is deployed in the borehole 106 to provide telemetry. Additional types of telemetry systems may also be deployed in the borehole 106 to transmit data from the quadrupole transmitter 120, a downhole tool that utilizes the quadrupole transmitter 120, and other downhole components to the controller 184.

Although FIGS. 1A and 1B each illustrates a surface based controller, in some embodiments, the controller 184 is deployed in a downhole location, such as along the conveyance 116. Further, although FIGS. 1A and 1B each illustrates a single quadrupole transmitter 120 deployed in the borehole 106, multiple quadrupole transmitters, such as the quadrupole transmitter 120 may be simultaneously deployed in the borehole 106 to simultaneously obtain measurements of the wave velocities of the formation 112 at different depths.

Figure 2B:
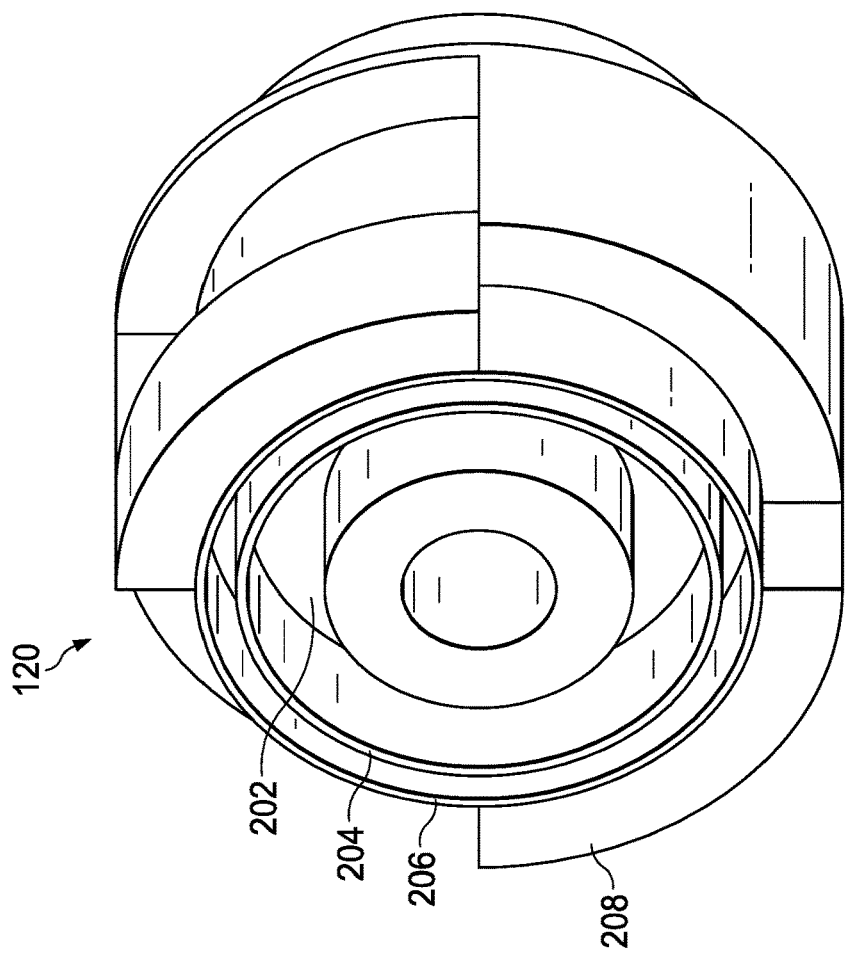
FIG. 2B is another cross-sectional view of the quadrupole transmitter of FIG. 1A.
Figure 2A:
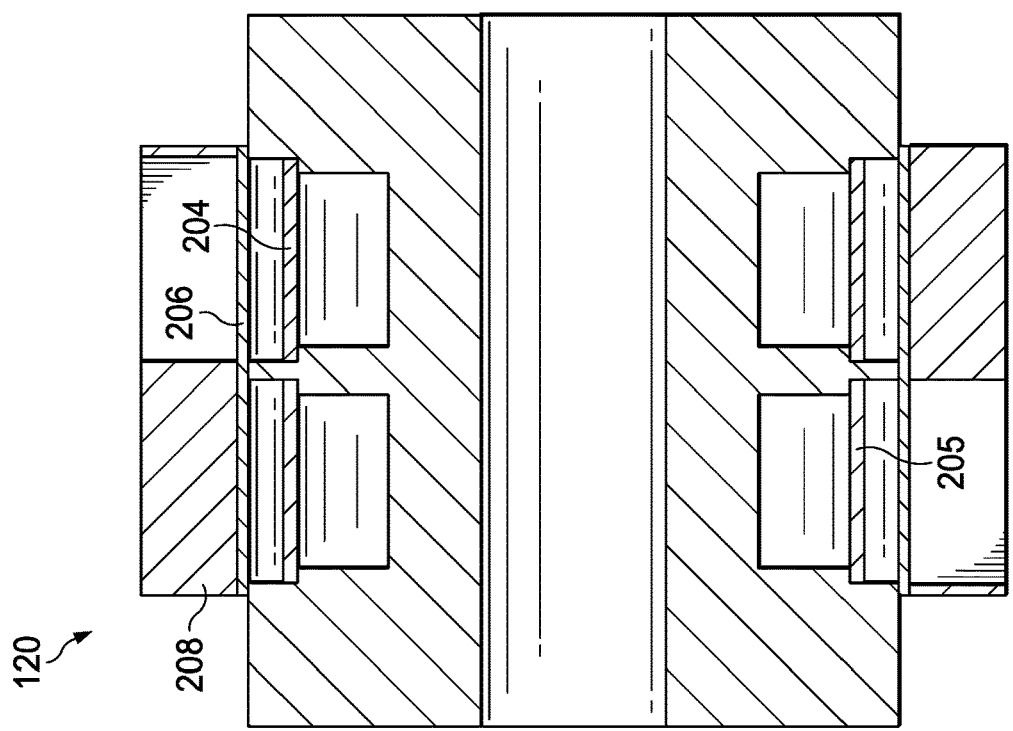
FIG. 2A is a cross-sectional view of the quadrupole transmitter of FIG. 1A.

FIG. 2A is a cross-sectional view of the quadrupole transmitter 120 of FIG. 1A. In the illustrated embodiments of FIG. 2A, the quadrupole transmitter 120 includes a first piezoelectric ring 204, a second piezoelectric ring 205, a covering sleeve 206, and a windowed sleeve 208. The covering sleeve 206 is positioned in between the first and second piezoelectric rings 204 and 205 and the windowed sleeve 208 to protect the first piezoelectric ring 204 and the second piezoelectric ring 205 from external containments. Different voltages are applied to the first piezoelectric ring 204 and the second piezoelectric ring 205 to cause the first piezoelectric ring 204 and the second piezoelectric ring 205 to alternatively expand and to contract relative to each other. In some embodiments, the amount of the voltage applied to the first piezoelectric ring 204 and the second piezoelectric ring 205 is varied based on the desired amount of compression and expansion of the first piezoelectric ring 204 and the second piezoelectric ring 205. Although FIG. 2A illustrates two piezoelectric rings, in other embodiments, the quadrupole transmitter 120 includes additional piezoelectric rings. In one or more of such embodiments, the quadrupole transmitter 120 also includes a third piezoelectric ring and a fourth piezoelectric ring. In such embodiments, the covering sleeve 206 and the windowed sleeve 208 also cover the third piezoelectric ring and the fourth piezoelectric ring.

FIG. 2B is another cross-sectional view of the quadrupole transmitter of FIG. 1A. As shown in FIG. 2B, the windowed sleeve 208 includes multiple window portions and covered portions that cover portions of the first piezoelectric ring 204 and the second piezoelectric ring 205. In the illustrated embodiment, the quadrupole transmitter 120 is a component of a downhole acoustic tool (not shown) and is fitted around a collared portion 202 of the downhole acoustic tool.

Figure 3:
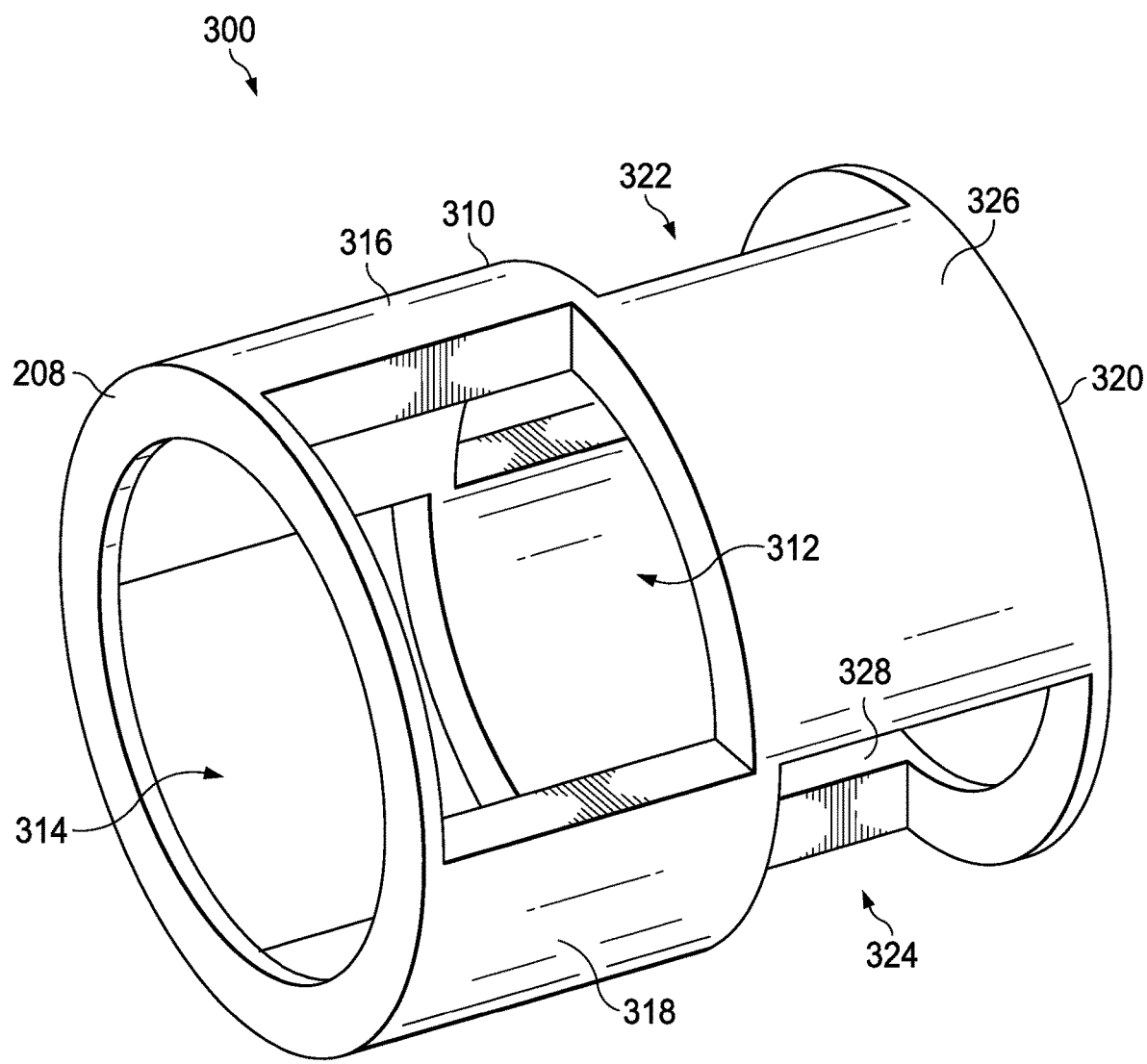
FIG. 3 is a side view of the windowed sleeve component of the quadrupole transmitter illustrated in FIGS. 2A and 2B.

FIG. 3 is a side view of the windowed sleeve component 208 of the quadrupole transmitter 120 illustrated in FIGS. 2A and 2B. As shown in FIG. 3, the windowed sleeve component 208 includes a first portion 310 and an adjacent second portion 320. The first portion 310 includes a first window section 312 and a second window section 314 that is substantially positioned opposite the first window section 312. The first portion 310 also includes a first covered section 316 and a second covered section 318 that is substantially positioned opposite the first covered section 316.

The second portion 320 includes a third window section 322 and a fourth window section 324 that is substantially positioned opposite the third window section 322. The second portion 320 also includes a third covered section 326 and a fourth covered section 328 that is substantially positioned opposite the third covered section 326. Further, the first window section 312 and the second window section 314 are substantially diagonal to the third window section 322 and the fourth window section 324. Similarly, the first covered section 316 and the second covered section 318 are substantially diagonal to the third covered section 326 and the fourth covered section 328. In the illustrated embodiment, each window portion is adjacent to two covered sections, and each covered section is adjacent to two window sections. In some embodiments, the dimensions of window sections and covered sections are approximately identical. In one or more of such embodiments, the surface of each window section or covered section is approximately 25% of the total surface area of a portion of the windowed sleeve component 208. In the illustrated embodiment, the first portion 310 covers the first piezoelectric ring 204 of FIG. 2A whereas the second portion 320 covers the second piezoelectric ring 205 of FIG. 2A. In other embodiments, where the quadrupole transmitter 120 includes additional piezoelectric rings, multiple piezoelectric rings are covered by the first portion 310. In further embodiments, where the quadrupole transmitter 120 of FIG. 2A includes additional piezoelectric rings, multiple piezoelectric rings are covered by the second portion 320. In further embodiments, where the quadrupole transmitter 120 includes additional piezoelectric rings, the windowed sleeve component 208 includes a third portion (not shown) adjacent to the second portion 320 and having a configuration of window sections and covered sections similar to the configuration of the first portion 310.

Figure 4:
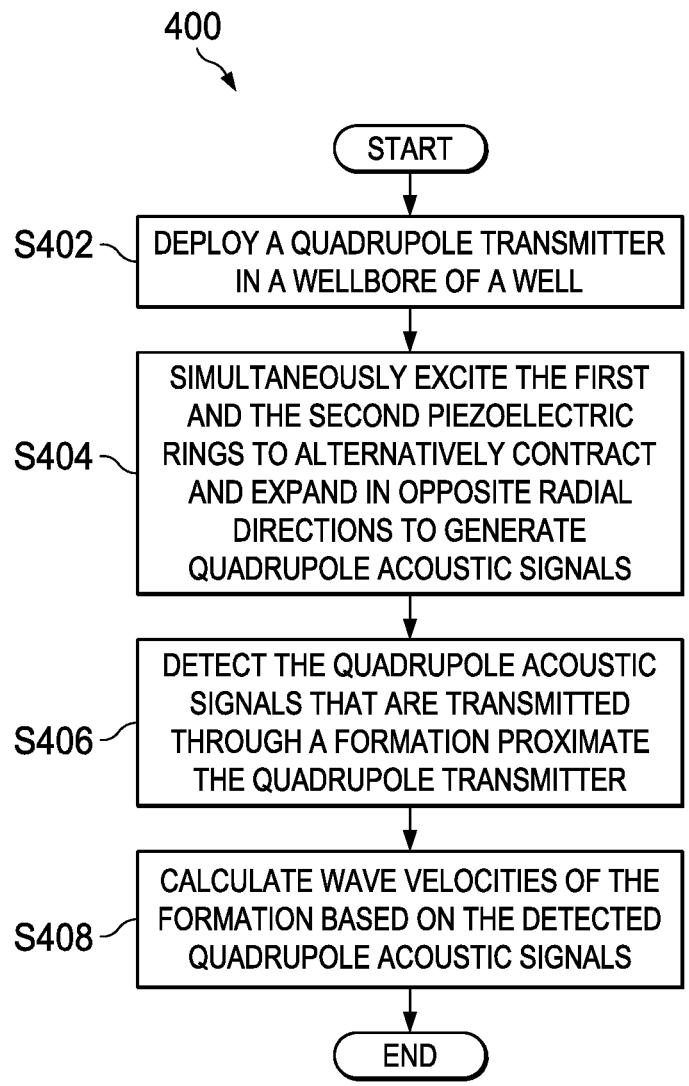
FIG. 4 is a flow chart of a process to determine wave velocities of a downhole formation.

FIG. 4 is a flow chart of a process 400 to determine wave velocities of a downhole formation, such as formation 112. Although the operations in the process 400 are shown in a particular sequence, certain operations may be performed in different sequences or at the same time where feasible.

At block S402, a quadrupole transmitter, such as the quadrupole transmitter 120 of FIG. 2A is deployed in a borehole of a well. The quadrupole transmitter 120 includes first piezoelectric ring 204 and second piezoelectric ring 205 of FIG. 2A. The quadrupole transmitter 120 also includes windowed sleeve 208 surrounding first and second piezoelectric rings 204 and 205.

At block S404, the first and the second piezoelectric rings 204 and 205 of the quadrupole transmitter 120 are simultaneously excited to alternatively contract and expand in opposite radial directions, which in turn, generates quadrupole acoustic signals. In some embodiments, different voltages are applied to the first and the second piezoelectric rings 204 and 205 to simultaneously excite first and the second piezoelectric rings 204 and 205 and to cause the first and the second piezoelectric rings 204 and 205 to alternatively contract and expand. In one or more embodiments, the amount of voltage applied to the first and to the second piezoelectric rings 204 and 205 is determined based on a desired amount of contraction and expansion of the two piezoelectric rings. In some embodiments, where the quadrupole transmitter 120 includes additional piezoelectric rings, voltages are also applied to the additional piezoelectric rings to simultaneously excite all of the piezoelectric rings.

At block S406 quadrupole acoustic signals that are transmitted through the formation 112 proximate the quadrupole transmitter 120 are detected. In some embodiments, where the quadrupole transmitter 120 is a component of a downhole acoustic tool having a receiver, the quadrupole acoustic signals are detected by the receiver of the downhole acoustic tool. In other embodiments, the quadrupole acoustic signals are detected by a receiver of another sensor or downhole tool. In some embodiments, data indicative of the quadrupole acoustic signals are transmitted to a processor, such as controller 184 of FIGS. 1A and 1B.

At block S408, wave velocities of the formation based on the detected quadrupole acoustic signals are calculated, such as by controller 184 of FIGS. 1A and 1B. In some embodiments, controller 184 processes data obtained by the receiver to calculate sheer wave velocities of formation 112. In other embodiments, controller 184 processes data obtained by the receiver to calculate compressional wave velocities of formation 112. In further embodiments, controller 184 processes data obtained by the receiver to calculate other types of wave velocities of formation 112. In further embodiments, where the quadrupole transmitter 120 is a component of a downhole tool, a processor of the downhole tool processes data obtained by the receiver to calculate compressional wave velocities of formation 112. In such embodiments, the calculated data are then transmitted to controller 184 via one or more telemetry means described herein.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a quadrupole transmitter, comprising: a first piezoelectric ring; a second piezoelectric ring that alternatively contracts and expands in opposite radial directions relative to the first piezoelectric ring in response to being simultaneously excited with the first piezoelectric ring; a covering sleeve surrounding exterior surfaces of the first piezoelectric ring and the second piezoelectric ring; and a windowed sleeve surrounding the first piezoelectric ring and the second piezoelectric ring, wherein the windowed sleeve comprises a first portion and a second portion adjacent to the first portion, and wherein the first portion and the second portion are each formed from a plurality of window sections and adjacent covered sections that are positioned around different sections of the first piezoelectric ring and the second piezoelectric ring to allow transmission of quadrupole acoustic signals when the first piezoelectric ring and the second piezoelectric ring are simultaneously excited.

Clause 2, the quadrupole transmitter of clause 1, wherein the first portion comprises a first window section, a second window section, a first covered section, and a second covered section, wherein the first window section and the second window section are positioned opposite each other and adjacent to the first covered section and the second covered section, wherein the second portion comprises a third window section, a third covered section, a fourth window section, and a fourth covered section, wherein the third window section and the fourth window section are positioned opposite each other and adjacent to the third covered section and the fourth covered section, and wherein the third window section and the fourth window section are positioned diagonally from the first window section and the second window section.

Clause 3, the quadrupole transmitter of clause 1 or 2, further comprising a third piezoelectric ring that contracts and expands in opposite radial directions relative to one of the first piezoelectric ring and the second piezoelectric ring in response to being simultaneously excited with at least one of the first piezoelectric ring and the second piezoelectric ring.

Clause 4, the quadrupole transmitter of any of clauses 1-3, further comprising a fourth piezoelectric ring that contracts and expands in opposite radial directions relative to the third piezoelectric ring in response to being simultaneously excited with the third piezoelectric ring.

Clause 5, the quadrupole transmitter of any of clauses 1-4, wherein one of the third piezoelectric ring and the fourth piezoelectric ring is covered by one of the first portion of the windowed sleeve and the second portion of the windowed sleeve, and wherein the other one of the third piezoelectric ring and the fourth piezoelectric ring is covered by the other one of the first portion of the windowed sleeve and the second portion of the windowed sleeve.

Clause 6, the quadrupole transmitter of any of clauses 1-5, wherein the windowed sleeve further comprises a third portion adjacent to the second portion and a fourth portion adjacent to the third portion, and wherein the third portion and the fourth portion are each formed from a plurality of window sections and adjacent covered sections that are positioned around different sections of the third piezoelectric ring and the fourth piezoelectric ring to allow transmission of quadrupole acoustic signals when the third piezoelectric ring and the fourth piezoelectric ring are simultaneously excited.

Clause 7, the quadrupole transmitter of any of clauses 1-6, wherein the covering sleeve is deployed between the windowed sleeve and the first and second piezoelectric rings.

Clause 8, the quadrupole transmitter of any of clauses 1-7, wherein the covering sleeve is formed from a plastic material and is less than 0.25 inch thick.

Clause 9, a downhole acoustic tool, comprising: a quadrupole transmitter, comprising: at least two piezoelectric rings that alternatively contract and expand; and a windowed sleeve surrounding the at least two piezoelectric rings and having a first portion and a second portion adjacent to the first portion, wherein the first portion and the second portion are each formed from a plurality of window sections and adjacent covered sections that are positioned around different sections of the at least two piezoelectric rings to allow transmission of quadrupole acoustic signals when the at least two piezoelectric rings are simultaneously excited; and a receiver to receive signals of waves transmitted through a formation proximate the downhole acoustic tool.

Clause 10, the downhole acoustic tool of clause 9, wherein the first portion comprises a first window section, a second window section, a first covered section, and a second covered section, wherein the first window section and the second window section are positioned opposite each other and adjacent to the first covered section and the second covered section, wherein the second portion comprises a third window section, a third covered section, a fourth window section, and a fourth covered section, wherein the third window section and the fourth window section are positioned opposite each other and adjacent to the third covered section and the fourth covered section, and wherein the third window section and the fourth window section are positioned diagonally from the first window section and the second window section.

Clause 11, the downhole acoustic tool of clauses 9 or 10, further comprising a third piezoelectric ring that contracts and expands in opposite radial directions relative to one of a first piezoelectric ring and a second piezoelectric ring in response to being simultaneously excited with at least one of the first piezoelectric ring and the second piezoelectric ring.

Clause 12, the downhole acoustic tool of any of clauses 9-11, further comprising a fourth piezoelectric ring that contracts and expands in opposite radial directions relative to the third piezoelectric ring in response to being simultaneously excited with the third piezoelectric ring.

Clause 13, the downhole acoustic tool of any of clauses 9-12, wherein the windowed sleeve further comprises a third portion adjacent to the second portion and a fourth portion adjacent to the third portion, and wherein the third portion and the fourth portion are each formed from a plurality of window sections and adjacent covered sections that are positioned around different sections of the third piezoelectric ring and the fourth piezoelectric ring to allow transmission of quadrupole acoustic signals when the third piezoelectric ring and the fourth piezoelectric ring are simultaneously excited.

Clause 14, the downhole acoustic tool of any of clauses 9-13, further comprising a collar portion for mounting the tool to a conveyance, wherein the quadrupole transmitter is mounted around the collar portion.

Clause 15, the downhole acoustic tool of any of clauses 9-14, further comprising a voltage source that provides different voltages to the first piezoelectric ring and the second piezoelectric ring to simultaneously excite the first piezoelectric ring and the second piezoelectric ring to alternatively contract and expand in opposite radial directions.

Clause 16, the downhole acoustic tool of clauses 9-15, further comprising a covering sleeve surrounding exterior surfaces of the at least two piezoelectric rings.

Clause 17, a method to determine wave velocities of a downhole formation, comprising: deploying a quadrupole transmitter in a borehole of a well, the quadrupole transmitter comprising: a first piezoelectric ring and a second piezoelectric ring; and a windowed sleeve surrounding the first piezoelectric ring and the second piezoelectric ring and having a first portion and a second portion adjacent to the first portion, wherein the first portion and the second portion are each formed from a plurality of window sections and adjacent covered sections that are positioned around different sections of the first piezoelectric ring and the second piezoelectric ring to allow transmission of quadrupole acoustic signals when the first piezoelectric ring and the second piezoelectric ring are simultaneously excited; simultaneously exciting the first piezoelectric ring and the second piezoelectric ring to alternatively contract and expand in opposite radial directions to generate quadrupole acoustic signals; detecting the quadrupole acoustic signals that are transmitted through a formation proximate the quadrupole transmitter; and calculating wave velocities of the formation based on the detected quadrupole acoustic signals.

Clause 18, the method of clause 17, wherein simultaneously exciting the first piezoelectric ring and the second piezoelectric ring comprises applying different voltages to the first piezoelectric ring and the second piezoelectric ring.

Clause 19, the method of clause 17 or 18, wherein calculating the wave velocities of the formation comprises calculating shear wave velocities of the formation.

Clause 20, the method of any of clauses 17-19, wherein calculating the wave velocities of the formation comprises calculating compressional wave velocities of the formation.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:
1. A quadrupole transmitter, comprising:
a first piezoelectric ring;
a second piezoelectric ring that alternatively contracts and expands in opposite radial directions relative to the first piezoelectric ring in response to being simultaneously excited with the first piezoelectric ring;
a covering sleeve surrounding exterior surfaces of the first piezoelectric ring and the second piezoelectric ring; and
a windowed sleeve surrounding the first piezoelectric ring and the second piezoelectric ring,
wherein the windowed sleeve comprises a first portion and a second portion adjacent to the first portion, and wherein the first portion and the second portion are each formed from a plurality of window sections and adjacent covered sections that are positioned around different sections of the first piezoelectric ring and the second piezoelectric ring to allow transmission of quadrupole acoustic signals when the first piezoelectric ring and the second piezoelectric ring are simultaneously excited.

2. The quadrupole transmitter of claim 1, wherein the first portion comprises a first window section, a second window section, a first covered section, and a second covered section, wherein the first window section and the second window section are positioned opposite each other and adjacent to the first covered section and the second covered section, wherein the second portion comprises a third window section, a third covered section, a fourth window section, and a fourth covered section, wherein the third window section and the fourth window section are positioned opposite each other and adjacent to the third covered section and the fourth covered section, and wherein the third window section and the fourth window section are positioned diagonally from the first window section and the second window section.

3. The quadrupole transmitter of claim 1, further comprising a third piezoelectric ring that contracts and expands in opposite radial directions relative to one of the first piezoelectric ring and the second piezoelectric ring in response to being simultaneously excited with at least one of the first piezoelectric ring and the second piezoelectric ring.

4. The quadrupole transmitter of claim 3, further comprising a fourth piezoelectric ring that contracts and expands in opposite radial directions relative to the third piezoelectric ring in response to being simultaneously excited with the third piezoelectric ring.

5. The quadrupole transmitter of claim 4, wherein one of the third piezoelectric ring and the fourth piezoelectric ring is covered by one of the first portion of the windowed sleeve and the second portion of the windowed sleeve, and wherein the other one of the third piezoelectric ring and the fourth piezoelectric ring is covered by the other one of the first portion of the windowed sleeve and the second portion of the windowed sleeve.

6. The quadrupole transmitter of claim 4, wherein the windowed sleeve further comprises a third portion adjacent to the second portion and a fourth portion adjacent to the third portion, and wherein the third portion and the fourth portion are each formed from a plurality of window sections and adjacent covered sections that are positioned around different sections of the third piezoelectric ring and the fourth piezoelectric ring to allow transmission of quadrupole acoustic signals when the third piezoelectric ring and the fourth piezoelectric ring are simultaneously excited.

7. The quadrupole transmitter of claim 1, wherein the covering sleeve is deployed between the windowed sleeve and the first and second piezoelectric rings.

8. The quadrupole transmitter of claim 7, wherein the covering sleeve is formed from a plastic material and is less than 0.25 inch thick.

9. A downhole acoustic tool, comprising:
a quadrupole transmitter, comprising:
at least two piezoelectric rings that alternatively contract and expand; and
a windowed sleeve surrounding the at least two piezoelectric rings and having a first portion and a second portion adjacent to the first portion, wherein the first portion and the second portion are each formed from a plurality of window sections and adjacent covered sections that are positioned around different sections of the at least two piezoelectric rings to allow transmission of quadrupole acoustic signals when the at least two piezoelectric rings are simultaneously excited; and
a receiver to receive signals of waves transmitted through a formation proximate the downhole acoustic tool.

10. The downhole acoustic tool of claim 9, wherein the first portion comprises a first window section, a second window section, a first covered section, and a second covered section, wherein the first window section and the second window section are positioned opposite each other and adjacent to the first covered section and the second covered section, wherein the second portion comprises a third window section, a third covered section, a fourth window section, and a fourth covered section, wherein the third window section and the fourth window section are positioned opposite each other and adjacent to the third covered section and the fourth covered section, and wherein the third window section and the fourth window section are positioned diagonally from the first window section and the second window section.

11. The downhole acoustic tool of claim 9, further comprising a third piezoelectric ring that contracts and expands in opposite radial directions relative to one of a first piezoelectric ring and a second piezoelectric ring in response to being simultaneously excited with at least one of the first piezoelectric ring and the second piezoelectric ring.

12. The downhole acoustic tool of claim 11, further comprising a fourth piezoelectric ring that contracts and expands in opposite radial directions relative to the third piezoelectric ring in response to being simultaneously excited with the third piezoelectric ring.

13. The downhole acoustic tool of claim 12, wherein the windowed sleeve further comprises a third portion adjacent to the second portion and a fourth portion adjacent to the third portion, and wherein the third portion and the fourth portion are each formed from a plurality of window sections and adjacent covered sections that are positioned around different sections of the third piezoelectric ring and the fourth piezoelectric ring to allow transmission of quadrupole acoustic signals when the third piezoelectric ring and the fourth piezoelectric ring are simultaneously excited.

14. The downhole acoustic tool of claim 9, further comprising a collar portion for mounting the downhole acoustic tool to a conveyance, wherein the quadrupole transmitter is mounted around the collar portion.

15. The downhole acoustic tool of claim 9, further comprising a voltage source that provides different voltages to the first piezoelectric ring and the second piezoelectric ring to simultaneously excite the first piezoelectric ring and the second piezoelectric ring to alternatively contract and expand in opposite radial directions.

16. The downhole acoustic tool of claim 9, further comprising a covering sleeve surrounding exterior surfaces of the at least two piezoelectric rings.

17. A method to determine wave velocities of a downhole formation, comprising:
deploying a quadrupole transmitter in a borehole of a well, the quadrupole transmitter comprising:
a first piezoelectric ring;
a second piezoelectric ring; and
a windowed sleeve surrounding the first piezoelectric ring and the second piezoelectric ring and having a first portion and a second portion adjacent to the first portion, wherein the first portion and the second portion are each formed from a plurality of window sections and adjacent covered sections that are positioned around different sections of the first piezoelectric ring and the second piezoelectric ring to allow transmission of quadrupole acoustic signals when the first piezoelectric ring and the second piezoelectric ring are simultaneously excited;

simultaneously exciting the first piezoelectric ring and the second piezoelectric ring to alternatively contract and expand in opposite radial directions to generate quadrupole acoustic signals;

detecting the quadrupole acoustic signals that are transmitted through a formation proximate the quadrupole transmitter; and calculating wave velocities of the formation based on the detected quadrupole acoustic signals.

18. The method of claim 17, wherein simultaneously exciting the first piezoelectric ring and the second piezoelectric ring comprises applying different voltages to the first piezoelectric ring and the second piezoelectric ring.

19. The method of claim 17, wherein calculating the wave velocities of the formation comprises calculating shear wave velocities of the formation.

20. The method of claim 17, wherein calculating the wave velocities of the formation comprises calculating compressional wave velocities of the formation.

* * * * *